US007624679B2

(12) United States Patent
Richman et al.

(10) Patent No.: US 7,624,679 B2
(45) Date of Patent: Dec. 1, 2009

(54) UNLOADER WITH LOOSE COTTON RETAINING APPARATUS FOR A COTTON COMPACTOR

(75) Inventors: Kevin S. Richman, Lititz, PA (US); Kenneth W. Brown, Port Byron, IL (US); Frank C. Dupire, Manheim, PA (US); Jimmy Ray Hargett, Bells, TN (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/206,474

(22) Filed: Sep. 8, 2008

(65) Prior Publication Data

US 2009/0078130 A1 Mar. 26, 2009

Related U.S. Application Data

(60) Provisional application No. 60/967,647, filed on Sep. 6, 2007.

(51) Int. Cl.
*B30B 1/00* (2006.01)
*A01D 90/10* (2006.01)

(52) U.S. Cl. .................... 100/188 R; 100/177; 56/449; 56/480; 414/111

(58) Field of Classification Search .................... 100/7, 100/151, 152, 177, 178, 226, 188 R, 218; 56/16.4 R, 16.6, 28, 341, 432, 449, 480; 414/111
See application file for complete search history.

(56) References Cited

U.S. PATENT DOCUMENTS 3,886,719 A 6/1975 Garrison et al. ............... 56/344
4,458,588 A 7/1984 Steele ........................ 100/100
4,553,378 A 11/1985 Fachini et al. ................ 56/16.6
5,192,177 A * 3/1993 Cardinal ..................... 414/501
5,338,140 A 8/1994 Ekdahl et al. ............... 414/346
5,540,144 A * 7/1996 Schrag et al. ........... 100/188 R
6,032,446 A 3/2000 Gola et al. .................... 56/341
6,692,352 B2 2/2004 Gerber et al. ............... 460/119
6,766,634 B2 7/2004 Covington et al. ............ 56/480
6,832,953 B1 12/2004 Ennen, Jr. ................... 460/119
6,969,315 B2 11/2005 Richman et al. ............ 460/119
7,018,290 B2 3/2006 Ramon et al. ............... 460/119
7,322,460 B2 1/2008 Covington et al. .......... 198/581

OTHER PUBLICATIONS

Kuhns U.S. Pat. Publication No. US 2004/0223833A1, published Nov. 11, 2004—US Class 414/111.

* cited by examiner

*Primary Examiner*—Jimmy T Nguyen
(74) *Attorney, Agent, or Firm*—Michael G. Harms; John William Stader; Patrick M. Sheldrake

(57) ABSTRACT

An unloader for a cotton compacting structure such as a module builder, including loose cotton retaining apparatus configured and operable for retaining loose cotton carried from, and returning the loose cotton to, the compacting structure. Apparatus of the invention can include an array or arrays of individual upstanding filaments, or flaps, located on a cotton conveying surface of a door arrangement or ramp extending from the compacting structure and over which a mass of compacted cotton or module is unloaded. The apparatus is configured to allow passage of a mass or module of compacted cotton thereover, while preventing passage of at least a substantial portion of any loose cotton following the mass or module along the surface. The apparatus is also configured for returning the loose cotton to the compacting structure upon folding or closing of the door or ramp.

13 Claims, 11 Drawing Sheets

36 68 60 60 22 60 12 10 54 54 42 68 40 38 32, 34 44 62 74 48 56 72 72 68 74 74 72 70 72 56 46 64 60 60 60 60

10
12
28
20
52
44
48
32, 34
36
38, 40
56
46
64
50
42
54
26
22
24
58
18
16
14
F 32
64
A
46
72
30
82
80
70
44
68
62
38

32
34
70,76
62
68
38
10
12
20

UNLOADER WITH LOOSE COTTON RETAINING APPARATUS FOR A COTTON COMPACTOR

This application claims the benefit of U.S. Provisional Application No. 60/967,647, filed Sep. 6, 2007.

TECHNICAL FIELD

This invention relates generally to an unloader for a cotton compacting structure such as a module builder, and more particularly, to an unloader having loose cotton retaining apparatus configured and operable for retaining loose cotton carried from, and returning the loose cotton to, the compacting structure.

BACKGROUND ART

U.S. Provisional Application No. 60/967,647, filed Sep. 6, 2007, is incorporated herein by reference in its entirety.

Presently, it is desired to provide the capability to densely compact harvested cotton into a unitary module on the harvesting machine as the cotton is being harvested, so as to eliminate the intermediate steps of compacting the cotton in a basket of the harvester then transporting either the collected cotton to a module builder or the module builder to the cotton and unloading the cotton into the module builder, and then further compacting the cotton into a cotton module. In the combined harvesting and module building machine, it is preferably desired to compact the cotton periodically in a compacting or module building chamber as it is received from the harvesting apparatus. In some instances, when the module is complete, it may still be desirable or necessary to continue harvesting until a row or section of a field is complete. As a result, a significant amount of loose or uncompacted cotton may be present in the module building chamber of the machine. This loose cotton can present a problem, as at least some part of it is likely to be unloaded with the module, which is be undesirable. In particular, loose cotton left on the ground is crop loss, and picking it up requires expenditure of time and effort.

Therefore, what is sought is an unloader for a cotton compacting structure such as a module builder of a combined cotton harvester and module builder, which effectively and conveniently contains and recovers loose cotton that may pass from the chamber of the compactor as a compacted cotton module is unloaded therefrom, such that the loose cotton is not lost and which overcomes one or more of the problems set forth above.

SUMMARY OF THE INVENTION

What is disclosed is an unloader for a cotton compacting structure such as a module builder of a combined cotton harvester and module builder, which effectively and conveniently contains and recovers loose cotton that may pass from the chamber of the compactor as a compacted cotton module is unloaded therefrom, such that the loose cotton is not lost and which overcomes one or more of the problems set forth above.

According to a preferred aspect of the invention, an unloader for a cotton compacting structure includes an unloading element mounted to the compacting structure and having a first end located adjacent to the open end of the compacting or module building chamber of the structure in position for receiving a mass of compacted cotton from the chamber thereon. The unloading element has a second end opposite the first end, and a first surface portion extending between the first end and an intermediate location disposed generally between the first and second ends. The unloading element has a second surface portion extending between the intermediate location and the second end, the unloading element being configured so as to be tiltable with the compacting structure downwardly toward the second end of the unloading element. The unloader includes at least one cotton driver extending along the floor, and at least one cotton driver extending along the second surface portion. Preferably, an unloader control is connected in operative control of the cotton drivers and is operable for moving a mass of compacted cotton in at least an unloading direction over the floor and the unloading element toward the second end thereof.

The unloader additionally includes loose cotton retaining apparatus disposed on the unloading element preferably generally at the intermediate location, the loose cotton retaining apparatus being configured so as to have an upstanding orientation when in an unbiased free state, to be resiliently yieldable in the unloading direction by application of a biasing force thereagainst by the mass of compacted cotton so as to lay on, even with, or in front of, the second surface portion, sufficiently to allow passage of the mass thereover, and so as to resiliently return to the upstanding orientation upon passage of the mass and in opposition to any biasing force applied thereagainst by only loose cotton on the first surface portion, for retaining the loose cotton on the first surface portion and to prevent passage of the retained loose cotton onto the second surface portion.

According to another preferred aspect of the invention, the unloading element comprises a folding door arrangement having a primary door segment pivotally mounted to the compacting structure and including the first surface portion, and a secondary door segment pivotally connected to an end of the primary door segment and including the second surface portion. The primary door segment is pivotable between an open position extending outwardly from, and in generally parallel relation to, the floor of the compacting structure, and a closed position disposed in covering relation to the open end of the compacting structure. The loose cotton retaining apparatus is configured and disposed for retaining the loose cotton on the first surface portion when the primary door segment is in the open position, such that the loose cotton will be able to slide therealong and into the open end of the compacting structure as the primary door segment is pivoted from the open position to the closed position.

According to one preferred embodiment, the loose cotton retaining apparatus will comprise an elongate, sidewardly extending array of upstanding resiliently flexible filaments, which can be mounted, for instance, on the second end of the primary door segment, or on the opposing end of the secondary door segment. According to another preferred embodiment, the apparatus will comprise an elongate elastomeric flap or flaps, which can also be mounted on either of the door segments. According to still another preferred embodiment, both the arrays of filaments, and the flap or flaps, can include gaps aligned with the drivers on the second surface portion (drag chains or the like) so as to be clear of the drivers as the mass of compacted cotton passes thereover.

DETAILED DESCRIPTION OF THE INVENTION

Figure 1:
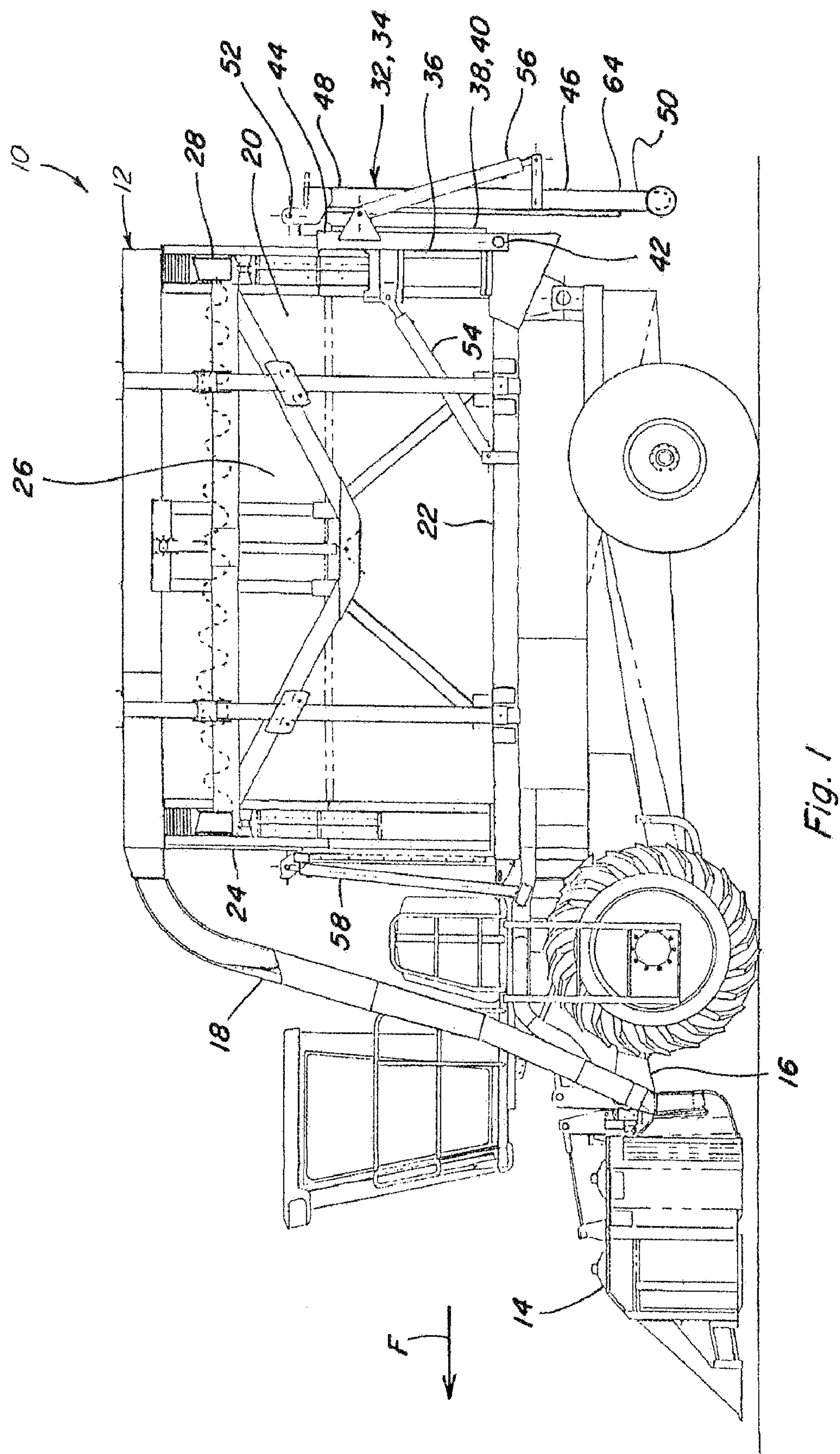
FIG. 1 is a simplified side view of a representative cotton harvesting machine including a cotton compacting structure which is a cotton module builder, including an unloader with which loose cotton retaining apparatus according to the present invention can be used.

Referring now to the drawings, in FIG. 1, a representative self-propelled mobile cotton harvesting machine 10 is shown, including a cotton compacting structure which is a module builder 12 for building a cotton module from cotton as it is harvested by machine 10. Cotton harvesting machine 10 includes a plurality of cotton harvesting row units 14 mounted transversely across a forward end 16 of machine 10 in the conventional manner, for removing cotton from cotton plants of a cotton field as machine 10 is driven in a forward direction, denoted by arrow F, over the field. After the cotton is removed from the cotton plants by row units 14, the cotton is conveyed through a cotton conveyor structure 18 from the row units 14 to module builder 12. Module builder 12 includes and defines a generally rectangular cotton compacting chamber 20 enclosed at its bottom by a floor 22, at its forward end by a forward wall 24, and on its sides by side walls 26, walls 24 and 26 extending upwardly from floor 22. A cotton compactor 28 is disposed in chamber 20 above floor 22 and is movable upwardly and downwardly toward floor 22 for compacting cotton received in chamber 20 from cotton conveyor structure 18 into a compacted, unitary cotton module 30, illustrated in FIG. 3 being unloaded from module builder 12.

Figure 2:
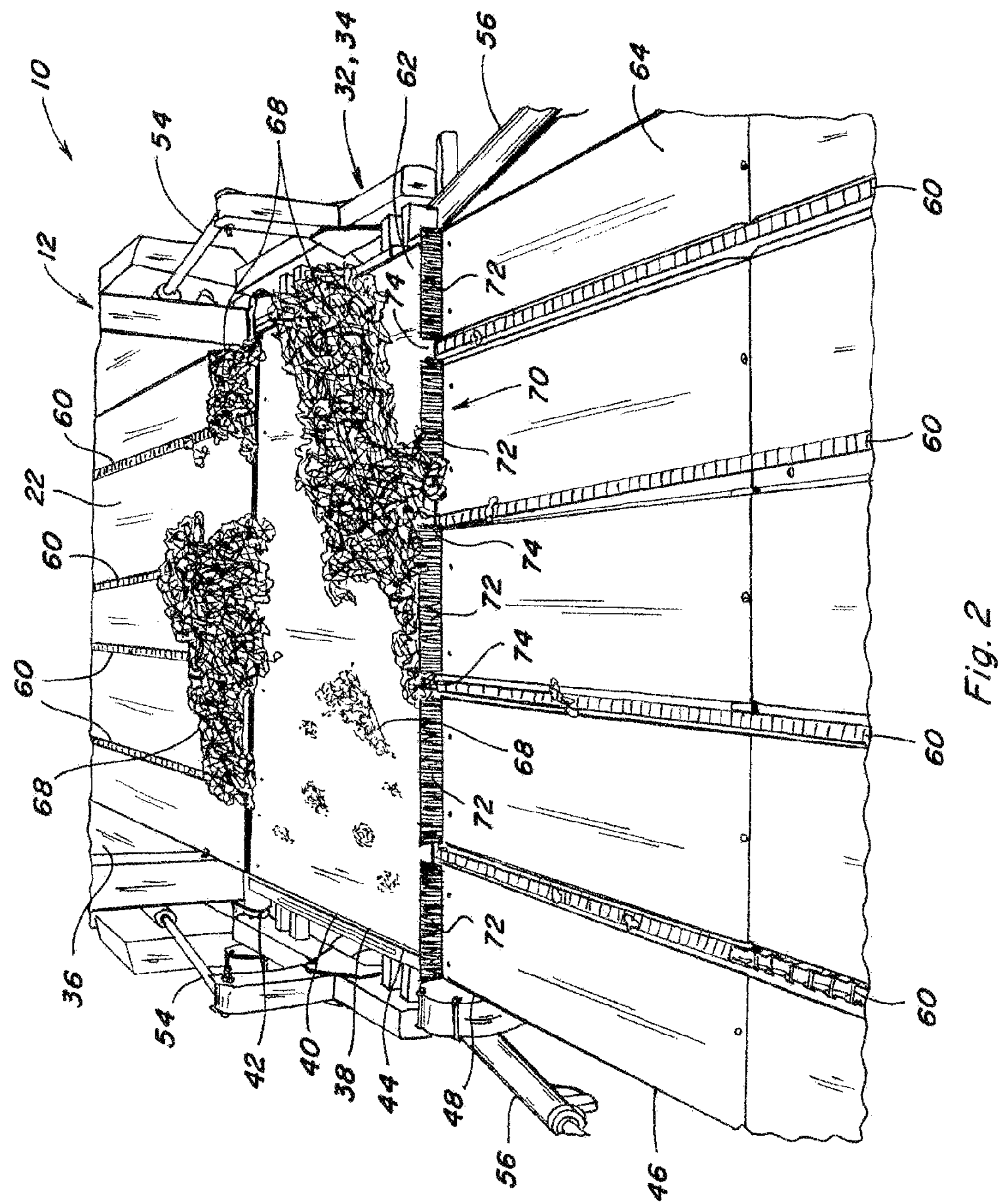
FIG. 2 is a fragmentary end view of the machine of FIG. 1, illustrating a folding door arrangement of the unloader in an unfolded position, and showing loose cotton thereon retained on a primary door segment of the door arrangement by one embodiment of loose cotton retaining apparatus of the invention.
Figure 3:
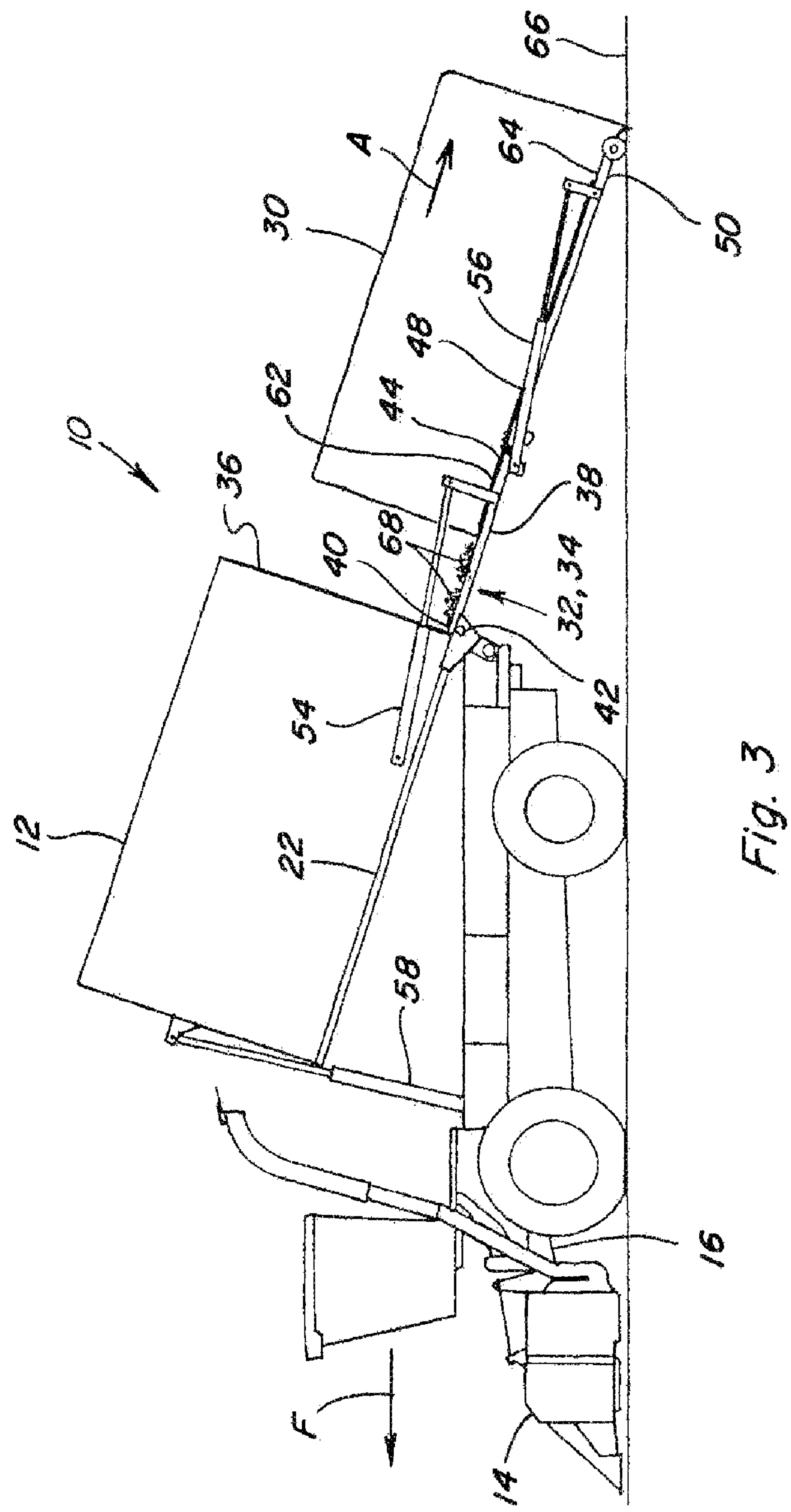
FIG. 3 is a simplified side view of the machine of FIG. 1, with the door arrangement of the unloader unfolded, and showing a cotton module being unloaded over the door arrangement.

Referring also to FIGS. 2 and 3, machine 10 includes an unloader 32 constructed and operable according to the present invention for unloading cotton modules such as module 30 from chamber 20, and also for optionally picking up and loading cotton modules into chamber 20. Unloader 32 preferably comprises a folding door arrangement 34 controllably operable for movement between a folded or closed position (FIG. 1) in closing relation to an open rear end 36 of module builder 12, and an unfolded or unloading position (FIGS. 2 and 3) in concert with tilting of module builder 12, for unloading modules such as module 30, and for optionally picking up cotton modules, as desired.

Figure 4:
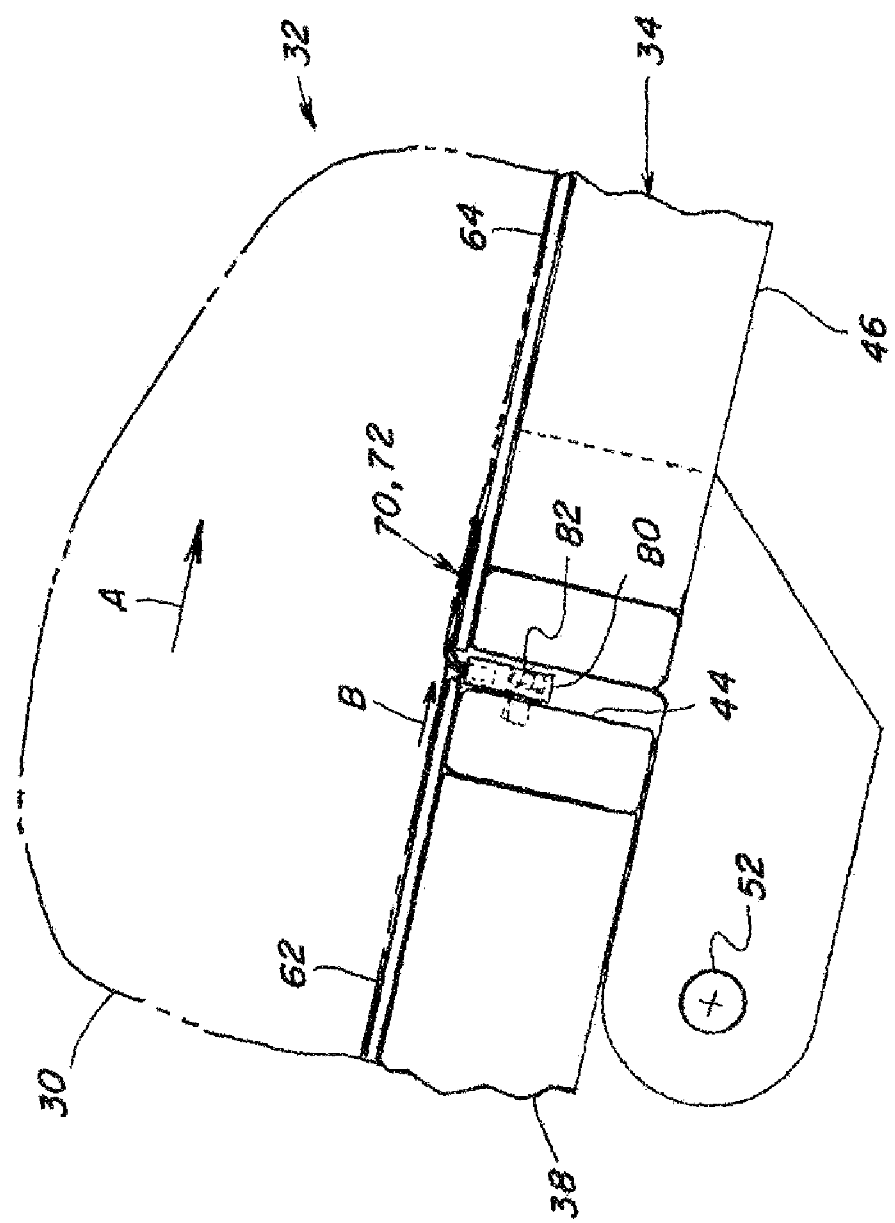
FIG. 4 is a fragmentary side view of the door arrangement and loose cotton retaining apparatus, illustrating a cotton module passing thereover.

Door arrangement 34 includes a primary door segment 38 having a proximal or first end 40 pivotally mounted to machine 10 or module builder 12 adjacent to open rear end 36 by a pivot 42, and a distal or second end 44 opposite first end 40. Primary door segment 38 is pivotally movable between a folded or closed position (FIG. 1) in at least partially closing or covering relation to open end 36, and an unfolded or open position (FIGS. 2 and 3) at least substantially parallel to floor 22. Unloader 32 includes a secondary door segment 46 having a proximal end 48 pivotally mounted to second end 44 of primary door segment 38 at an intermediate location between module builder 12 and a free end 50 of secondary door segment 46 by a pivot 52 (FIGS. 1 and 4). Secondary door segment 46 is pivotally movable between a folded or closed position in generally side-by-side or overlaying relation to primary door segment 38 (FIG. 1), and an unfolded or unloading position aligned so as to be at least substantially coplanar with and in end-to-end relation to primary door segment 38 and floor 22 (FIGS. 2 and 3).

A pair of primary door drivers 54 are pivotally connected between module builder 12 and primary door segment 38, and are operable for pivotally moving primary door segment 38 between the closed or folded position and the open or unfolded position. Unloader 32 includes a pair of secondary door drivers 56 connected between primary door segment 38 and secondary door segment 46 and operable for pivotally moving secondary door segment 46 between its folded position and its unfolded or unloading position.

In the present instance, a completed cotton module such as module 30 will have a length of about 16 feet, and can weigh about 11,000 pounds. When unfolded, primary door segment 38 is about 8 feet long, and secondary door segment 46 about 11 feet long for a combined length of about 19 feet. Here, it should be understood that other sizes and geometries are also contemplated according to the present invention.

To effect the tilting of module builder 12 to a desired angle of inclination relative to a surface onto which a cotton module is to be unloaded, or from which a cotton module is to be loaded, machine 10 includes at least one and preferably two tilt drivers 58 suitably mounted and located for tilting module builder 12.

To effect forward to rearward movement of a cotton module such as a module 30 from module building chamber 20 and onto primary door segment 38, floor 22 includes at least one driver 60 which preferably is a conventional drag chain operable in a forward to rearward direction for dragging or urging a cotton module within chamber 20 rearwardly, and operable in the opposite direction for moving or urging the module forwardly. Similarly, secondary door segment 46 includes at least one cotton driver 60, also preferably comprising a forwardly and rearwardly operable drag chain. Cotton drivers 60 on floor 22 and on door segment 46 are preferably independently operable using conventional hydraulic motors, electric motors, or by connection to an engine of machine 10 or other motive source in any suitable manner.

To facilitate unloading, floor 22, a first surface portion 62 on primary door segment 38, and a second surface portion 64 on secondary door segment 46, over which a cotton module is moved for unloading, preferably comprise low friction polymer sheets or coatings. The construction and operation of a typical module builder and cotton or unloader drivers, and the composition of the low friction polymer, are variously explained in greater detail in Covington et al., U.S. Pat. No. 6,766,634, issued Jul. 27, 2004, and U.S. Pat. No. 7,322,460, issued Jan. 29, 2008, which are hereby incorporated herein by reference in their entireties.

The combination of the tilting of module builder 12, operation of unloaders 60 on floor 22 and secondary door segment 46, the length of a module (16 feet verses 9 feet for door segment 38), and use of a low friction material on surface portions 62 and 64, provides a capability to move modules such as a module 30, over the length of floor 22 and surface portions 62 and 64, without the need for cotton drivers on surface portion 62, which can be advantageous for the purposes of the invention.

Briefly, when unloading a cotton module, such as module 30, with the module builder tilted and door arrangement 34 unfolded, operation of cotton drivers 60 is initiated to begin moving module 30 in the rearward direction, denoted by arrow A in FIG. 3, through open rear 36 of module builder 12 to free end 50. After leaving floor 22, operation of drivers 60 on that surface may be ceased. As the module is unloaded, machine 10 is moved in the forward direction, denoted by arrow F, at a speed substantially corresponding to the rearward speed of movement of module 30, such that module 30 is unloaded onto a surface 66, which can be the ground or the like, without being damaged.

Often, when a cotton module is complete, it will be desirable to continue harvesting, to the end of a row or field or section of a field, the thus harvested cotton being allowed to collect in module builder 12 primarily above the module in locations such as spaces between augers or other components of cotton compactor 28, as well as spaces thereabove. When a module such as module 30 is unloaded from module builder 12, at least some of this loose cotton, denoted at 68, will be scraped from the top of the module and will fall therefrom and from cotton compactor 28 onto floor 22 and be carried or moved by cotton drivers 60 from module builder 12 in following or trailing relation to the module being unloaded. Rather than losing this cotton, or having to pick it up, it is desired to return the loose cotton 68 to module builder 12 for compaction into a subsequently built module, or for later unloading at another location.

Figure 5:
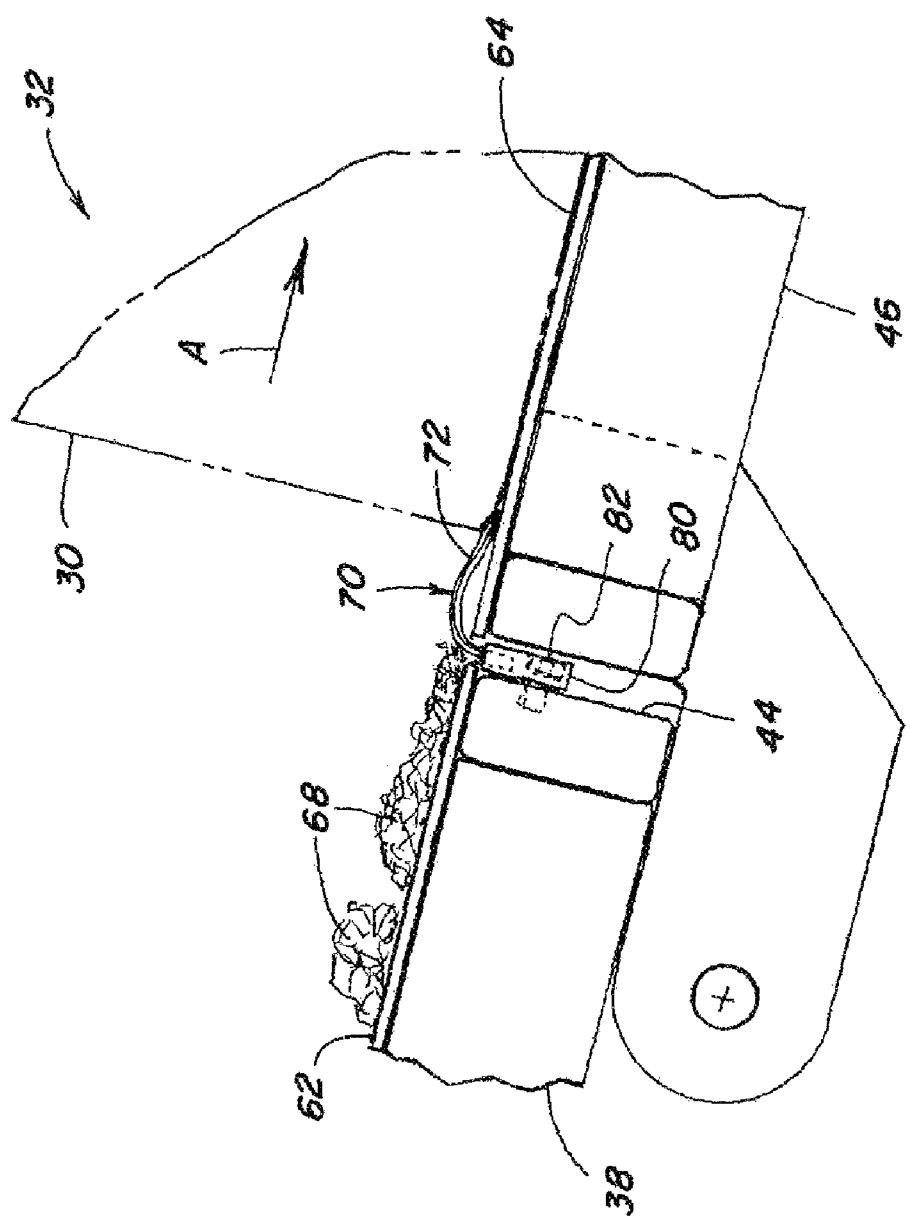
FIG. 5 is another fragmentary side view of the door arrangement, showing the loose cotton retaining apparatus beginning to return to its upstanding free state orientation after passage of a cotton module thereover.
Figure 6:
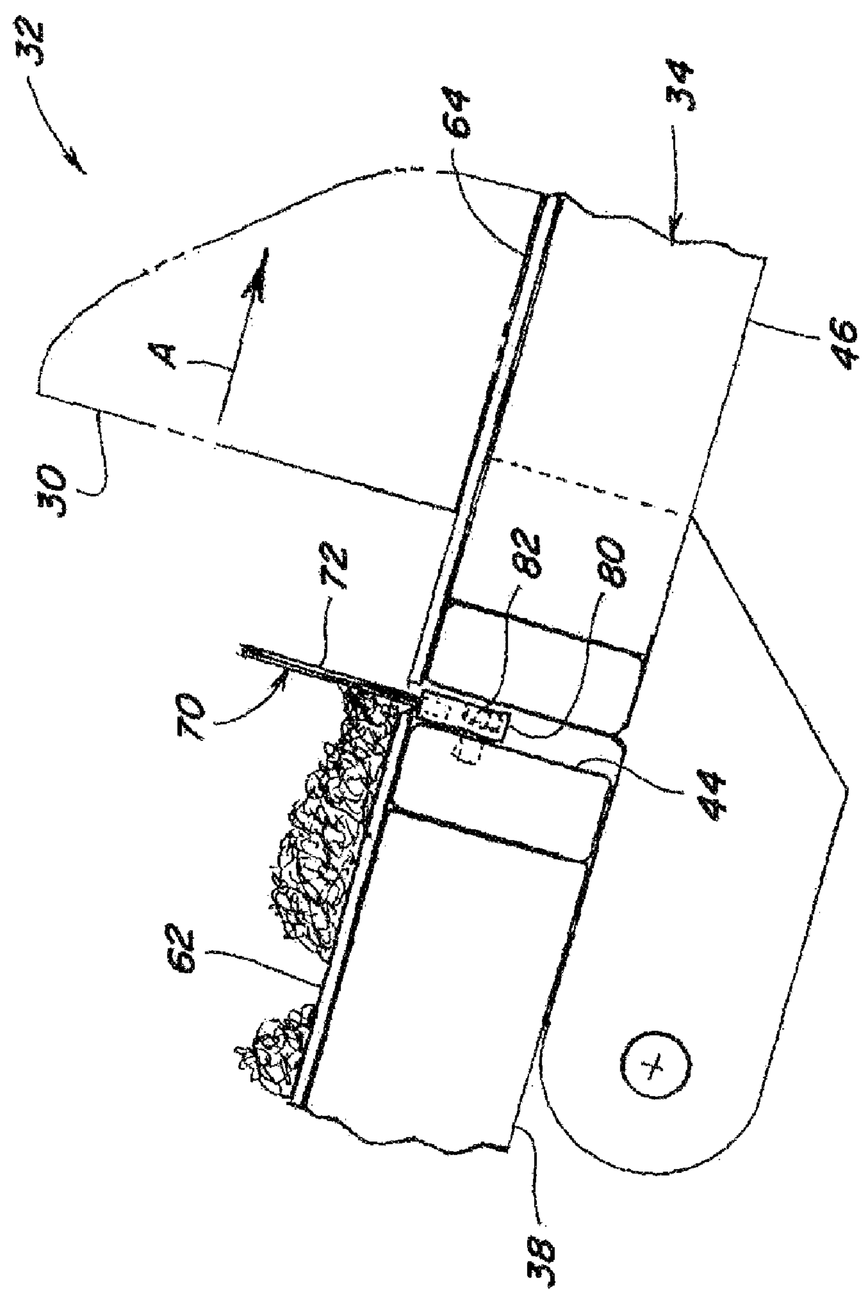
FIG. 6 is still another fragmentary side view of the door arrangement, showing the loose cotton retaining apparatus fully returned to its upstanding free state orientation, and retaining loose cotton on the primary door segment after passage of a cotton module thereover.
Figure 7:
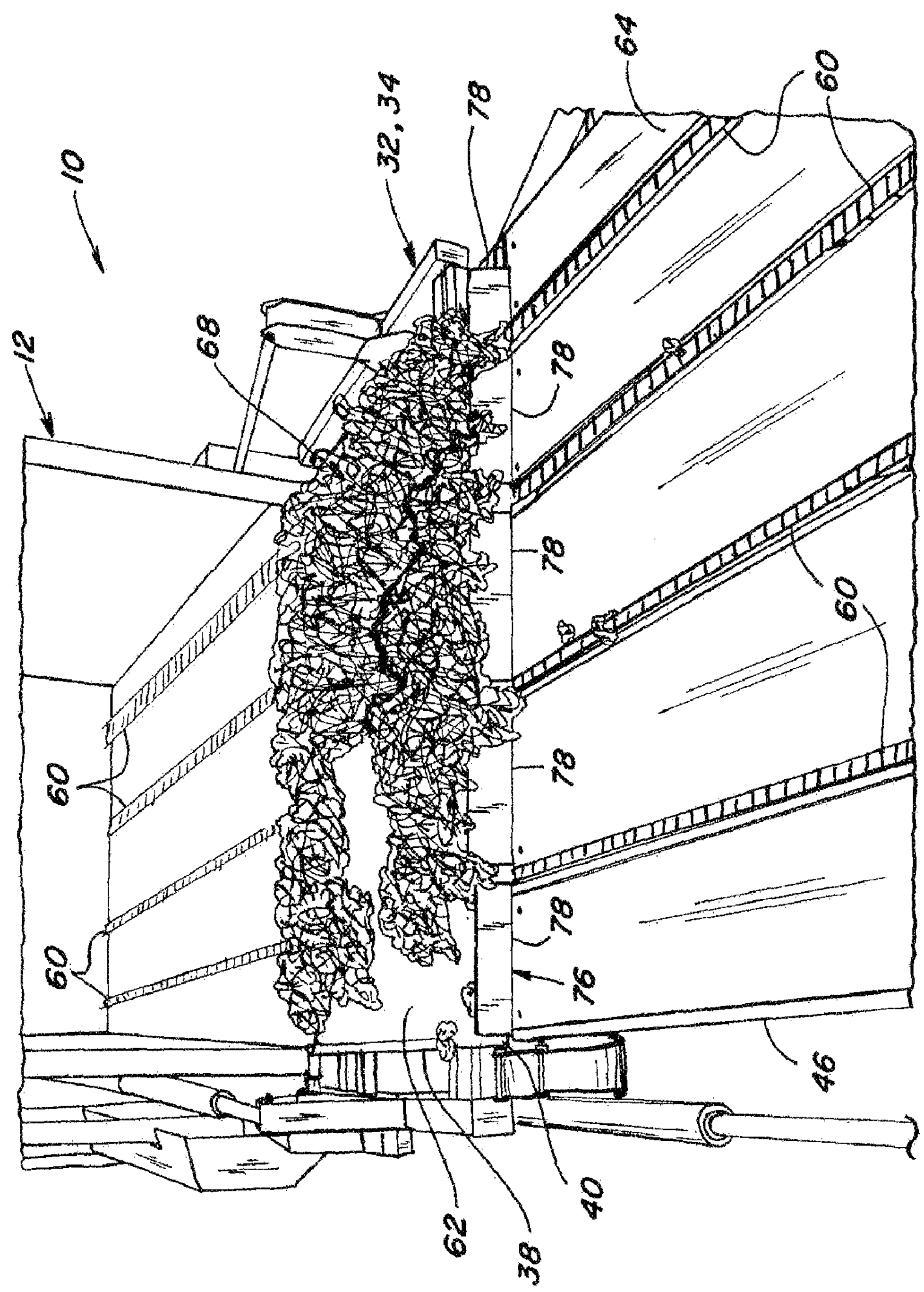
FIG. 7 is another fragmentary end view of the machine of FIG. 1, illustrating the folding door arrangement of the unloader in an unfolded, unloading mode, and showing loose cotton thereon retained on the primary door segment of the door arrangement by another embodiment of loose cotton retaining apparatus of the invention.
Figure 8:
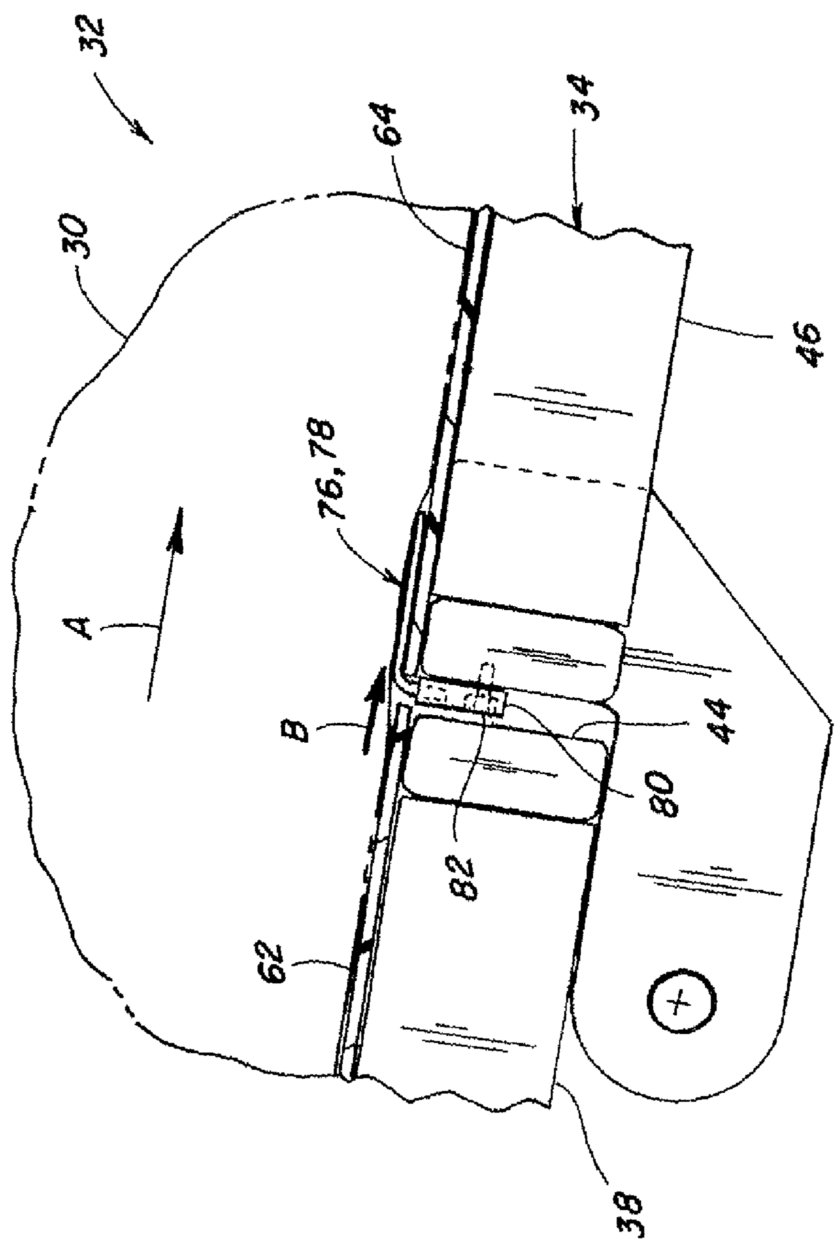
FIG. 8 is a fragmentary side view of the door arrangement and loose cotton retaining apparatus of FIG. 7, illustrating a cotton module passing thereover.

Referring also to FIGS. 4, 5 and 6, unloader 32 includes loose cotton retaining apparatus 70 on folding door arrangement 34, between first surface portion 62 of primary door segment 38, and second surface portion 64 of secondary door segment 46. Loose cotton retaining apparatus 70 comprises an array or arrays of filaments 72 extending across substantially the entire width of first surface portion 62, filaments 72 being configured so as to have an upstanding orientation when in an unbiased free state (FIGS. 2 and 6), and so as to be resiliently yieldable at least in the unloading direction (FIG. 4) by application of a biasing force thereagainst, as denoted by arrow B, by a compacted mass of cotton, such as a cotton module 30, as it contacts filaments 72, such that filaments 72 will bend over and lay on second surface portion 64, sufficiently to allow passage of module 30 thereover, and further, so as to resiliently and rapidly or immediately return to the upstanding orientation upon passage of module 30 (FIG. 5). This rapid or immediate return to the upstanding orientation is desirable and important, and should be sufficiently fast, such that filaments 72 will retain any, or a substantial portion of any, loose cotton 68 on first surface portion 62, and prevent passage thereof onto second surface portion 64.

Figure 9:
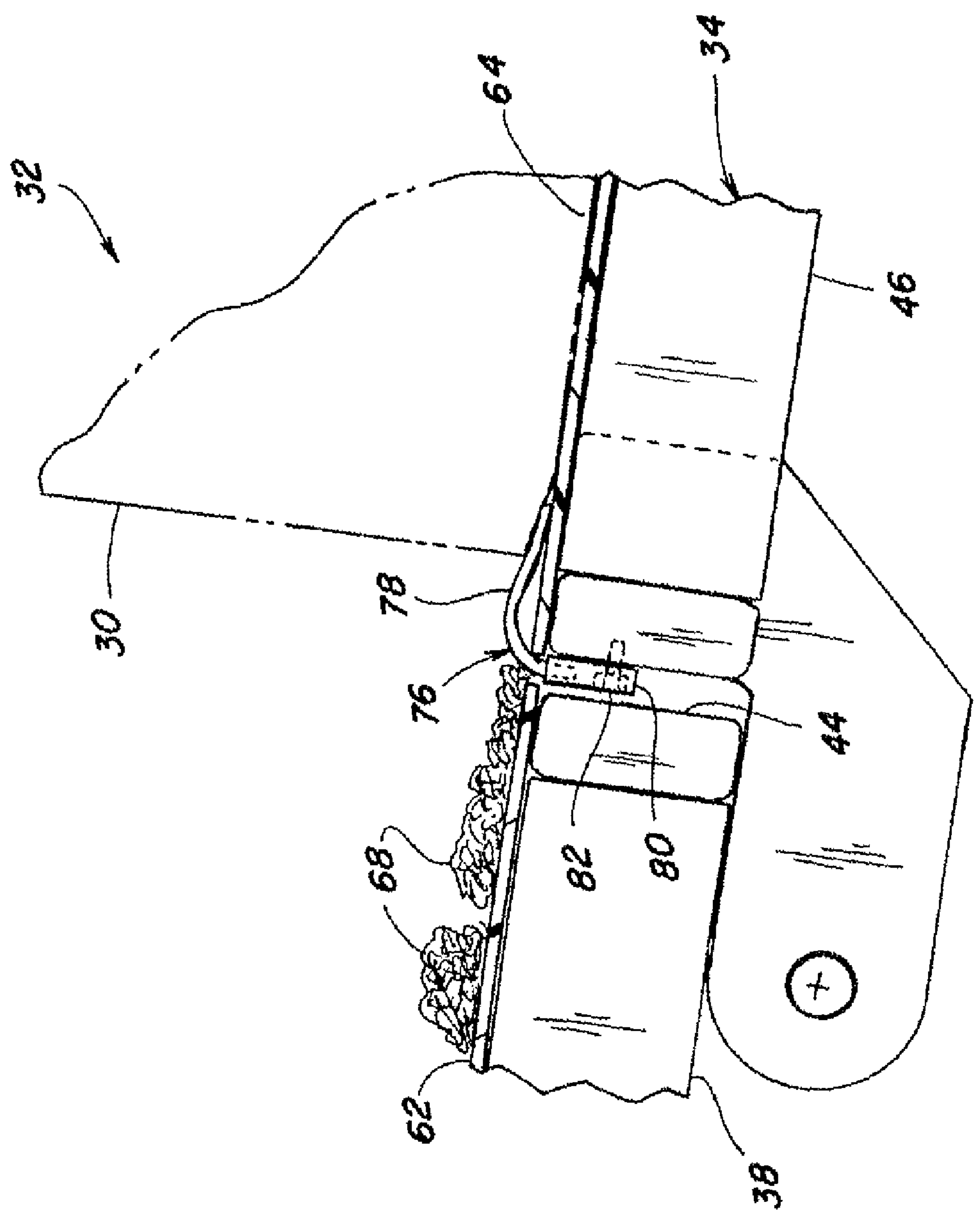
FIG. 9 is another fragmentary side view of the door arrangement and loose cotton retaining apparatus of FIG. 8, with the retaining apparatus beginning to return to its upstanding free state orientation after passage of a cotton module thereover.
Figure 10:
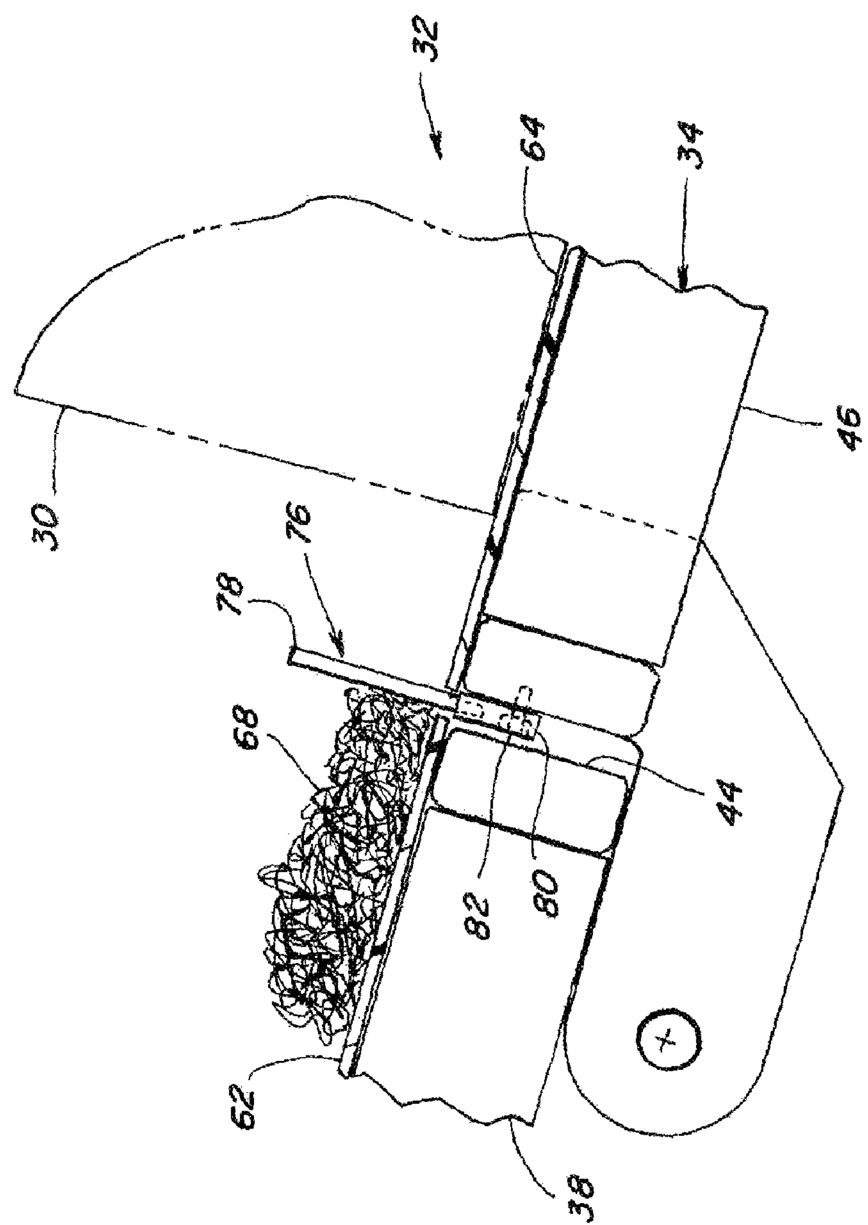
FIG. 10 is still another fragmentary side view of the door arrangement of FIG. 7, showing the loose cotton retaining apparatus fully returned to its upstanding free state orientation, and retaining loose cotton on the primary door segment after passage of a cotton module thereover.

Referring also to FIGS. 7, 8, 9 and 10, unloader 32 is shown including another embodiment of loose cotton retaining apparatus 76 constructed and operable according to the teachings of the present invention, on folding door arrangement 34, between first surface portion 62 of primary door segment 38, and second surface portion 64 of secondary door segment 46. Apparatus 76 comprises a series of elongate flaps 78 extending across substantially the entire width of first surface portion 62, flaps 78 being configured so as to have an upstanding orientation when in an unbiased free state (FIGS. 7 and 10), and so as to be resiliently yieldable at least in the unloading direction (FIG. 8) by application of a biasing force thereagainst, as denoted by arrow B, by a compacted mass of cotton, such as a cotton module 30, as it contacts flaps 78, such that flaps 78 will lay over on second surface portion 64, sufficiently to allow passage of module 30 thereover, and further, so as to resiliently and rapidly or immediately return to the upstanding orientation upon passage of module 30 (FIG. 9). As with filaments 72, this rapid or immediate return to the upstanding orientation is desirable and important, and should be sufficiently fast, such that flaps 78 will retain any loose cotton 68 on first surface portion 62, and prevent passage thereof onto second surface portion 64.

Loose cotton retaining apparatus 70 and 76 can be mounted, for instance, on second end 44 of primary door segment 38, e.g., see apparatus 70, so as to extend upwardly from a gap between door segments 38 and 46, on the opposing end of secondary door segment 46, e.g., see apparatus 76, or on another suitable portion of unloader 32, for achieving the capabilities and advantages of the present invention. Mounting the respective apparatus 70 and 76 can be achieved, for instance, using elongate clamps 80 which capture and retain the lower portions of the filaments and flaps, and which are held in place by fasteners 82, such as screws or the like, that can be threadedly received in the end of the door segment to which the apparatus is mounted. Here, it should be understood that clamps 80 can be adjustable height-wise to allow apparatus 70 and 76 to be positioned and configured such that filaments 72 and flaps 78 will bend or fold or otherwise move out of the way of the cotton module to allow it to smoothly and uninterruptedly pass thereover, and that this can include bending or other movement onto surface portion 64, or into a space between surface portions 62 and 64, if present, and that filaments 72 and flaps 78 are preferably sufficiently resilient and robust so as to essentially spring back to the upstanding state, or close to that state, even in opposition to forces applied thereto by a pile of cotton. It should also be understood that the apparatus 70 and 76 can be incorporated at locations other than between surface portions 62 and 64, such as, but not limited to, on surface 62 closer to module builder 12, or adjacent the edge of the module builder, as desired or required for a particular application. It should be further understood that the loose cotton apparatus of the invention is preferably configured to allow passage of a mass of compacted cotton in a loading direction opposite the unloading direction, as desired or required for a particular application.

Figure 11:
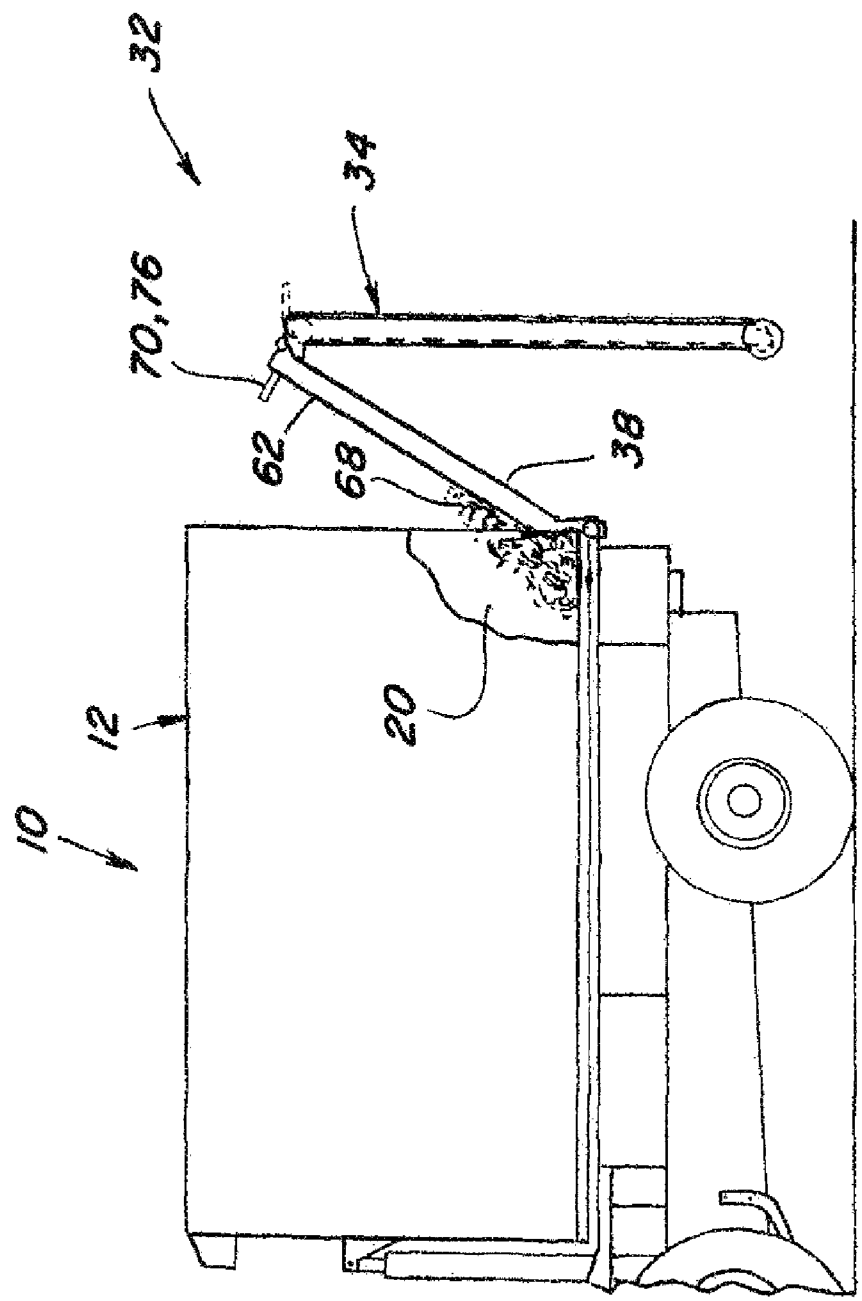
FIG. 11 is a fragmentary side view of the machine of FIG. 1, showing the door arrangement partially folded, for returning loose cotton to the cotton compacting chamber.

Referring also to FIG. 11, folding door arrangement 34 of unloader 32 is illustrated in a partial folded position, wherein primary door segment 38 is tilted toward module builder 12 of machine 10, such that any loose cotton 68 retained on surface portion 62 by loose cotton retaining apparatus 70 or 76, will slide along the surface portion so as to reenter chamber 20 of the module builder and be recovered, and to thereby eliminate any need for picking up the loose cotton. Subsequently, this recovered loose cotton can be incorporated into another cotton module or otherwise utilized. Here, it should be recognized that the apparatus of the invention can be utilized with a wide variety of unloader door constructions, such as a one-piece door, or the like.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

What is claimed is:

1. An unloader for a cotton compacting structure including a cotton compacting chamber, the chamber having a floor therein, at least one cotton driver extending along the floor, and an open end, the unloader comprising:

an unloading element mounted to the compacting structure and having a first end located adjacent to the open end of the chamber in position for receiving a mass of compacted cotton from the chamber thereon, a second end opposite the first end, a first surface portion extending between the first end and an intermediate location disposed generally between the first and second ends, a second surface portion extending between the intermediate location and the second end, the unloading element being configured so as to be tiltable with the compacting structure downwardly toward the second end of the unloading element;

at least one cotton driver extending along the second surface portion, and the first surface portion is without a cotton driver; and loose cotton retaining apparatus disposed on the unloading element generally at the intermediate location, the loose cotton retaining apparatus being configured so as to have an upstanding orientation when in an unbiased free state, to be resiliently yieldable in an unloading direction by application of a biasing force thereagainst by the mass of compacted cotton so as to allow passage of the mass thereover, and to resiliently return to the upstanding orientation upon passage of the mass and in opposition to any biasing force applied thereagainst by only loose cotton on the first surface portion, for retaining the loose cotton on the first surface portion and to prevent passage of the retained loose cotton onto the second surface portion, wherein the loose cotton retaining apparatus comprises an array of upstanding filaments extending across at least a substantial portion of the unloading element, and the filaments is configured to bend over and lay on top of the second surface portion when the mass of compacted cotton contacts the filaments.

2. The unloader of claim 1, wherein the loose cotton retaining apparatus is mounted on an end of the first surface portion.

3. The unloader of claim 1, wherein the unloading element comprises a folding door arrangement having a primary door segment pivotally mounted to the compacting structure and including the first surface portion, and a secondary door segment pivotally connected to an end of the primary door segment and including the second surface portion, the primary door segment being pivotable between an open position extending outwardly from, and in generally parallel relation to, the floor of the compacting structure, and a closed position disposed in covering relation to the open end of the compacting structure, the loose cotton retaining apparatus being configured and disposed for retaining the loose cotton on the first surface portion when the primary door segment is in the open position, such that the loose cotton will be able to slide therealong and into the open end of the compacting structure as the primary door segment is pivoted from the open position to the closed position.

4. The unloader of claim 3 wherein the at least one cotton driver extending along the floor of the compacting structure, operable in cooperation with the at least one cotton driver extending along the second surface portion for moving a mass of compacted cotton over the first surface portion.

5. The unloader of claim 4, wherein the cotton drivers extending along the second surface portion comprise a plurality of drag chains extending in the unloading direction in spaced relation one to the other, and wherein the loose cotton retaining element is configured to be resiliently flexible or bendable in the unloading direction, and includes gaps aligned with the drag chains on the second surface portion, such that the retaining element when flexed or bent will not significantly contact the drag chains.

6. The unloader of claim 4, wherein the first surface portion is covered with a low friction material to facilitate passage of a mass of compacted cotton thereover.

7. An unloader for a cotton compacting structure including a cotton compacting chamber, the chamber having a floor therein and an open end, the unloader comprising:

a folding door arrangement having a primary door segment pivotable between an open position extending outwardly from the open end and a closed position covering at least a lower region of the open end, the primary door segment including a first end pivotally mounted to the compacting structure and a first surface portion having a first end located adjacent to the open end of the chamber and positioned for receiving a mass of compacted cotton from the chamber thereon when the primary door segment is in the open position, the primary door segment including a second end opposite the first end, and a secondary door segment having a proximal end pivotally mounted to the second end of the primary door segment, a free end opposite the proximal end, and a second surface portion extending between the proximal end and the free end;

cotton drivers extending along the floor and the second surface portion, the cotton drivers being configured and controllably operable for moving a compacted cotton module along the floor, and over the first surface portion and the second surface portion for unloading the module from the compacting structure, the first surface portion is without a cotton driver; and loose cotton retaining apparatus disposed on the folding door arrangement and extending thereacross generally intermediate the first surface portion and the second surface portion, the loose cotton retaining apparatus positioning between the second end of the primary door segment and the proximal end of the secondary door segment, the loose cotton retaining apparatus being configured to have a substantially upwardly extending free state and to be resiliently yieldable toward the second surface portion for allowing the mass of compacted cotton to pass thereover, and to substantially immediately return to the upstanding free state upon completion of passage of the mass of compacted cotton thereover, for retaining loose cotton on the first surface portion from reaching the second surface portion, wherein the loose cotton retaining apparatus comprises at least one strip of an elastomeric material, and the at least one strip of an elastomeric material is configured to bend over and lay on top of the second surface portion when the mass of compacted cotton contacts the at least one strip of an elastomeric material.

8. The unloader of claim 7, wherein loose cotton retaining element extends from about 4 to about 12 inches above the first surface portion.

9. The unloader of claim 7, wherein the loose cotton retaining element comprises gaps therein aligned with the cotton drivers extending along the second surface portion, respectively.

10. A folding unloading door arrangement for a cotton compacting structure having a floor therein and an open end, the door arrangement comprising:

a primary door segment pivotable between an open position extending outwardly from the open end and a closed position covering at least a lower region of the open end, the primary door segment including a first end pivotally mounted to the compacting structure and a first surface portion having a first end located adjacent to the open end of a compacting chamber and positioned for receiving a mass of compacted cotton from the chamber thereon when the primary door segment is in the open position, the primary door segment including a second end opposite the first end, and a secondary door segment having a proximal end pivotally mounted to the second end of the primary door segment, a free end opposite the proximal end, and a second surface portion extending between the proximal end and the free end;

cotton drivers extending along the floor of the compacting structure and the second surface portion, the cotton drivers being configured and controllably operable for moving a compacted cotton module along the first surface portion and the second surface portion for unloading the module from the compacting structure, the first surface portion is without a cotton driver; and loose cotton retaining apparatus extending across the door arrangement intermediate the first surface portion and the second surface portion, the loose cotton retaining apparatus positioning between the second end of the primary door segment and the proximal end of the secondary door segment, the loose cotton retaining apparatus having a substantially upwardly extending free state and being configured so as to be resiliently yieldable toward a second state extending generally parallel to the second surface portion for allowing the mass of compacted cotton to pass thereover, and to substantially immediately return to the upstanding free state after passage of the mass of compacted cotton thereover for retaining loose cotton on the first surface portion and preventing the retained loose cotton from reaching the second surface portion, wherein the loose cotton retaining apparatus comprises at least one array of resilient filaments, and the filaments is configured to bend over and lay on top of the second surface portion when the mass of compacted cotton contacts the filaments.

11. The door arrangement of claim 10, wherein the loose cotton retaining apparatus is attached to the second end of the primary door segment.

12. The door arrangement of claim 10, wherein loose cotton retaining element extends from about 4 to about 12 inches above the first surface portion.

13. The door arrangement of claim 10 wherein the loose cotton retaining element comprises gaps therein aligned with the cotton drivers extending along the second surface portion, respectively.

* * * * *